United States Patent Office 3,187,850
Patented June 8, 1965

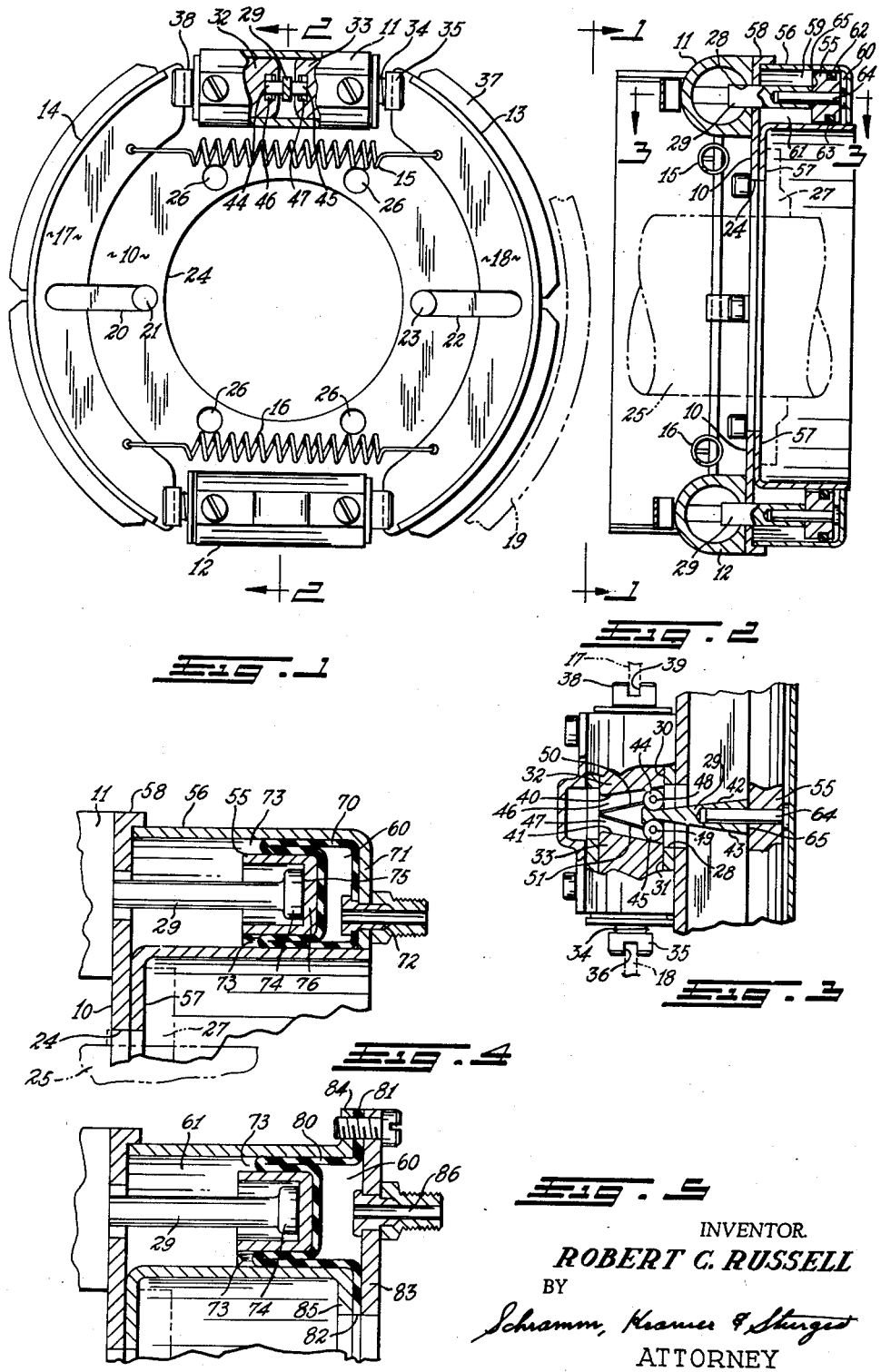

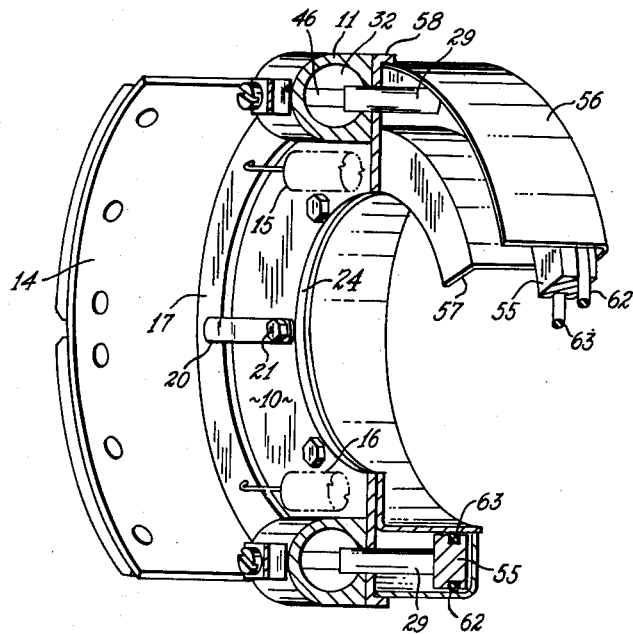

3,187,850
ANNULAR MOTOR ACTUATED DRUM BRAKE
MECHANISM
Robert C. Russell, Asheville, N.C., assignor to Eaton
Manufacturing Company, Cleveland, Ohio, a corporation of Ohio
Filed Sept. 12, 1963, Ser. No. 308,538
14 Claims. (Cl. 188—152)

This invention relates, as indicated, to brake mechanisms, and more particularly to improved power actuating means for a wedge-type operator for moving a brake shoe assembly and moving it into frictional engagement with a brake drum. This invention has particular utility in dual wedge operated brakes although it is applicable to multi-wedge brake systems, in general.

For exemplary purposes, this discussion will be concerned with the type of brake assembly which utilizes a brake drum and a plurality of brake shoes adapted to be moved into frictional engagement with the inside of the drum. The drum is usually mounted on the wheel, and the shoes mounted for radial movement into and out of engagement with the drum on an assembly secured to the axle housing. The shoes are driven toward the drum by means of shoe actuating members adapted to force adjacent extremities of the brake shoes toward the drum. The brakes can be of the fixed anchor two leading or two trailing shoe type with actuation at one end of the shoes, or of the full floating two leading shoe type with actuation at one end of the shoes, or of the full floating two leading shoe type with actuation at both ends of the shoes.

To impart the necessary movement of the ends of the shoes in either the fixed anchor or full floating types (such movement being along a chord of the drum), a wedge is used as the operating member. The wedge drives an adjacent shoe actuating member or members (plungers), toward the drum along a chord of the drum, thus forcing the ends of the shoes apart to effect engagement of brake shoes with the inside of the drum. Upon release of the brake, the wedge is withdrawn allowing the adjacent actuating member or members to move inwardly in response to return springs acting to draw the brake shoes inwardly and away from the drum. Instead of a tapered plane surface of the wedge operating directly against a complementarily tapered plane surface of the shoe actuating member or plunger, the art has utilized rollers interposed between two such plane surfaces to minimize friction, and has also provided cage means to retain the rollers. Springs are provided to pull the brake shoes away from the drum surface when the fluid pressure, or mechanically applied force, is released.

A indicated above, wedge-type actuating means have been used heretofore and the motivating power provided most usually by fluid means, e.g. hydraulic liquid or compressed air. In either case, the area over which the force is transmitted is important, and in pneumatically operated brakes in particular, relatively large circular diaphragm motor means have been employed for driving the wedges under the shoe plungers to force the shoes apart and into frictional engagement with the drum. To secure sufficient power transmission, the diameter of the diaphragms has had to be relatively large, and where more than one wedge operator has been used a separate diaphragm motor has been provided for each.

In the past, difficulty has been experienced in construction and assembly of wedge operated brakes to accommodate the axle housing and the axle suspension system. Both the axle housing and the suspension system have enforced limitations on motor side and disposition thereby introducing troublesome design and assembly problems. For example, where individual pneumatic disc diaphragm motors are used to actuate wedge operators, the size of the diaphragm air chamber casings necessary to provide sufficient braking force has necessitated disposing the air chambers at an angle relative to the drum axis so that they will clear the axle housing and the axle flange. Alternatively, the air chambers have been offset radially outwardly of the axle with the wedge being operated through a bell crank assembly. In certain other instances, special angular dispositions of the brake assemblies for various suspension systems or axle sizes, and/or modifications in the suspension systems themselves preclude the use of these devices altogether.

The motors of the present invention are annular and can be readily accommodated to limitations imposed by the axle housing and various suspension systems. Moreover, these motors can be fully assembled with the balance of the brake mechanism before attachment to the axle flange thus enabling "unit assembly" of the braking mechanism.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly, then, novel motor means are employed to operate two or more wedge-plunger assemblies, such motor means being in the form of an annular piston mounted on the same axis as the brake drum. Sufficient area is provided for pneumatic or hydraulic actuating. The piston coacts with the wedge operator along a line or thrust axis which is perpendicular to the axis of the shoe actuating plungers and the length of the wedge or operator member may be greatly shortened or lengthened and still efficiently coupled to the motor.

Briefly stated, the present invention is the provision in a wedge operated rotatable drum brake assembly having movable drum engaging members, actuating members or plungers, each having one extremity coupled for movement with a corresponding adjacent drum engaging member, respectively, and having the other extremity tapered transverse to its axis, a plurality of operating members reciprocably movable along a thrust axis perpendicular to the axes of the plungers each operating member having an axially tapered free extremity adapted for wedging coaction with the tapered extremities of plungers. This coaction converts movement of the operating members along a thrust axis perpendicular to the axes of the plungers into drum engaging movement of the drum engaging members, usually along a chord of the drum. There is provided according to this invention in such a structure a motor including a power actuated member encircling the drum axis and adjacent the operating member, and means for coupling the operating member to the power actuating member for reciprocation therewith.

The present invention may be better understood by having reference to the annexed drawings which are illustrative of a preferred embodiment of the present invention, and wherein:

FIG. 1 is an elevation of an improved brake assembly in accordance with this invention and showing a full floating two leading shoe type of brake assembly utilizing two brake shoes which are mounted for movement into and out of contact with a brake drum.

FIG. 2 is a cross-sectional view of the brake mechanism of FIG. 1 and taken in the plane indicated by the line 2—2 of FIG. 1, and showing in cross section an annular piston motor of this invention.

FIG. 3 is a fragmentary cross-sectional view, partially cut away, showing the wedge or operator member and the brake shoe actuating plungers taken in the plane indicated by the line 3—3 of FIG. 2.

FIGS. 4 and 5 are fragmentary cross-sectional views of alternative embodiments of the annular piston type motor means of the present invention and showing a tubular type diaphragm in FIG. 4, and a channel type diaphragm (FIG. 5).

FIG. 6 is a partial cross-sectional and partially cut away perspective view of a brake assembly of the present invention and showing a fluid actuated annular piston driving motor for operating a wedge member.

Like reference numerals indicate like parts on the drawings and in the description.

With more particular reference to FIG. 1, there is here shown a double ended or full floating two leading shoe type brake mechanism and the supporting means therefor adapted to be secured to the axle of a vehicle.

The brake mechanism is assembled around a centrally located spider 10 having two cast wedge actuator housings 11 and 12. As indicated, the brake is of the full floating two leading shoe type and includes identical brake shoes 13 and 14. Brake shoes 13 and 14 are held in retracted position by two springs 15 and 16, which are similarly attached at their opposite ends to the respective shoe webs 17 and 18. Brake shoes 13 and 14 are centered axially with respect to the brake drum 19 partially shown in FIG. 1 in dotted lines by any suitable means, such as by spring clips 20 and 22 secured to the spider 10 by bolts 21 and 23, respectively, on the transverse center line of the brake. Clip 20, which is of conventional design and diagrammatically shown in FIG. 2, embraces the web 17 of brake shoe 14 and urges it against a suitable abutment shoulder, not shown, on the spider 10. In like manner, spring clip 22 is secured as by bolt 23 to spider 10, embraces the web 18 of brake shoe 13 and urges it against an abutment on the spider 10. In this manner, both brake shoes are centrally aligned within the drum enclosure, and each of the clips 20 and 22 permits slidable rocking operational displacement of the shoe.

Spider 10 has a central opening 24 adapted to fit over the axle housing 25 (FIG. 2), and is provided with a plurality of circumferentially spaced bolt holes 26 for securing the assembly to an axle flange, such as axle flange 27 in FIG. 2.

As best shown in FIG. 2, the spider 10 is provided with integral axially extending wedge housings 11 and 12, respectively. Wedge housings 11 and 12 extend at right angles to the spider 10 as shown in FIGS. 2 and 6. As best shown in FIG. 3, the wedge actuator housing is provided with a side opening 28 of substantially rectangular configuration for slidably receiving the operating member or wedge 29. On opposite ends, housing 11 is provided with coaxial cylindrical bores 30 and 31 that are desirably, although not necessarily, continuous and of the same diameter. Brake actuating plungers 32 and 33 are slidably disposed in bores 30 and 31, respectively.

Side opening 28 opens into both bores 30 and 31 and permits disposition of the roller and wedge assembly between the plungers 32 and 33 whereby movement of the wedge 29 along a thrust axis perpendicular to the axis of the plungers 32 and 33 causes the plungers 32 and 33 to move laterally in opposite directions, i.e. along a chord of brake drum 19.

Plunger 33 is conveniently provided with a concentric internal thread adapted to receive in concentrically disposed relation threaded extensible adjustment member 34, the outer extremity of which is provided with slotted shoe engaging cap 35. Cap 35 is provided with slot 36 in the outer face thereof to receive web 18 of brake shoe 13. Thus, as the brake lining 37 wears, the adjustment member 34 may be extended from plunger 33 to adjust the brake shoe 13 for proper disposition with respect to the drum 19.

No adjustment means are provided on plunger 32, the outer face 38 of which is slotted at 39 to receive the web 17 of brake shoe 14. Slots 36 and 39 in the outer faces of cap 35 and plunger extension 38 abut the shoe webs 18 and 17, respectively, so that the latter are rockably and slidably engaged thereby.

Plungers 32 and 33 are provided at their inner extremities with inclined roller engaging surfaces 40 and 41, respectively, and operating member or wedge 29 is also provided with complementarily inclined roller engaging surfaces 42 and 43. Disposed between confronting inclined roller engaging surfaces 40 and 42, for example, there is provided a roller 44 in contacting relation with both inclined surfaces, which inclined surfaces define a roller guide space. In like manner, between confronting inclined roller engaging surfaces 41 and 43, there is provided a roller 45 in contact with each of said surfaces, such surfaces also defining a corresponding roller guide space. In the specific embodiment best shown in FIGS. 1 and 3, plungers 32 and 33 are each provided at their inner extremities with inclined planar grooves 46 and 47 of rectangular cross-sectional configuration, respectively, the rollers each being provided with axially extending projections 48 and 49, respectively, the rollers 44 and 45 being retained within the grooves 46 and 47 by means of roller retaining lips 50 and 51 integral with plungers 32 and 33. The retaining lips 50 and 51 are formed with suitable openings so that the outer surface of the rollers 44 and 45 will extend therethrough for rolling engagement with the wedge 29.

While the foregoing description has been confined to the details of plungers 32 and 33 in brake actuator housing 11, it will be understood that the structure of brake actuator housing 12 is identical therewith and need not be further described.

The foregoing description describes briefly a typical wedge-type brake assembly of conventional design with which the motor means of the present invention are particularly well adapted for use. It will, of course, be understood that wedge-type structures other than that particularly described above may be employed with the motor devices hereof.

In order to drive the wedges 29 along thrust axes which are perpendicular to the axes of the plungers, e.g. plungers 32 and 33, and preferably parallel to the drum axis, the present invention provides a motor including a power actuated member which encircles the drum axis and is disposed closely adjacent the wedge 29, and means for coupling the power actuated member to the wedge 29. In FIG. 2 there is shown one embodiment of a fluid activated motor wherein the motor includes an annular piston 55 reciprocably movable in an annular cylinder casing 56. In this embodiment, cylinder casing 56 is of generally U-shaped cross section, one of the upstanding legs thereof being provided with an annular sealing flange 57 adapted to be secured to spider 10. The opposite leg of casing 56 is adapted for engagement with annular flange 58. Annular piston 55 is disposed within the annular cylinder casing 57 for reciprocal movement within annulus 59 toward and away from the spider 10, and divides the annular cylinder chamber 59 into a high pressure portion 60 and a low pressure portion 61. Thus, when fluid under pressure is applied to the high pressure sub-chamber or portion 60, piston 55 is urged forwardly toward the spider 10. By virtue of coupling means coacting between piston 55 and wedge 29, power is transmitted to the operator member 29 along the thrust axis thereof parallel to the axis of the drum. In order to minimize the loss of fluid pressure from high pressure sub-chamber 60 to low pressure sub-chamber 61, suitable sealing means coacting between piston 55 and casing 56 are provided such as ring seals 62 and 63. Any suitable pressure relief means may be provided to prevent build-up of pressure in the low pressure chamber 61, e.g. an air vent provided by a non-air tight fit between casing 56 and annular flange 58.

As best shown in FIG. 2, piston 55 is coupled to wedge 29 directly by means of pin 64 which is firmly held by piston 55 and extends into the rearward portion of wedge 29. The rearward face 65 of wedge 29 is disposed in abutting relation with the forward face of annular piston 55 forming an interface through which the force applied to piston 55 is transmitted to wedge 29.

As indicated above, FIGS. 4 and 5 illustrate alternative embodiments of the present invention utilizing a diaphragm of the rolling type. One form of rolling diaphragm is shown in FIG. 4. There is here shown a rolling diaphragm 70 which is in the form of a continuous closed tube. Diaphragm 70 is disposed in the casing 56 adjacent the closed extremity 71 between the casing head 71 and the piston 55. The high pressure sub-chamber 60 is, therefore, completely enclosed by the rolling diaphragm 70 with the exception of the inlet port or ports 72 through which fluid under pressure is admitted to high pressure sub-chamber 60. For most purposes, the pressurized fluid is compressed air. Rolling diaphragm 70 is conveniently formed of a fiber reinforced elastomeric material, e.g. nylon fiber reinforced rubber, either natural or synthetic. Piston 55 is of smaller diameter than the piston shown in FIG. 2 in order to permit reverse folding of the rolling diaphragm 70 in the annular space 73 between piston 55 and casing 56. Piston 55 in the embodiment shown in FIG. 4 is an annular channel member of substantially U-shaped cross section having the closed portion adjacent the rolling diaphragm 70 and the open portion extending toward spider 10.

The coupling between piston 55 and operator 29 is in the form of an enlarged head 74 integral with wedge operator 29, the outer face 75 of which is adapted for abutting coaction with the base 76 of piston 55. Pin means such as pin 64 may be provided to secure wedge operator 29 to piston 55 if desired.

FIG. 5 shows another embodiment utilizing another rolling diaphragm. Instead of a closed tubular structure, rolling diaphragm 80 is open to provide a pair of marginal edges 81 and 82 adapted to be tightly clamped between cylinder head 83 and cylinder flanges 84 and 85, respectively, to isolate high pressure sub-chamber 60 from low pressure sub-chamber 61. Cylinder head 73 is then provided with a suitable inlet 86 through which fluid under pressure, e.g. compressed air, may be introduced into high pressure sub-chamber 60. In all other respects, the structure shown in FIG. 5 is identical with the structure shown in FIG. 6.

FIG. 6, as above indicated, is a partially cut away, partially cross-sectional perspective view of a brake assembly in accordance with the present invention and showing more clearly the motor means of the present invention and its disposition relative to a pair of wedge-type operating members in a full floating two leading shoe type brake assembly. FIG. 6 corresponds in detail to the structure shown in FIG. 2 and like parts are correspondingly numbered.

There has thus been provided an improved motor for driving force transmitting means into engagement with a force receiving means rotating relative thereto, such motor means being in the form of an annular piston reciprocably mounted within an annular cylinder chamber including means for sub-dividing the annular cylinder chamber into a high pressure chamber and a low pressure chamber. These motors may be fluid operated either with hydraulic liquid or compressed gas, e.g. air. Because of the relatively large area provided by an annular piston disposed between a high pressure sub-chamber and a low pressure sub-chamber, the requisite engaging force is easily generated. In the case of braking mechanisms this force is uniformly transmitted to two or more wedges which function to drive brake shoe plungers along chords of the drum and in turn to bring brake drum engaging members into frictional engagement with the brake drum. Instead of a plurality of individual motors for operating each of a plurality of operating members or wedges, a single motor is adaptable for operating two or more wedges, thus assuring application of the identical pressure to each wedge. Moreover, the annular piston-cylinder structure is readily accommodated by present wheel-axle assemblies characterized by an axle flange to which the brake assembly is secured. These parts are relatively simple, easily assembled, and accessible.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as my invention:

1. In a wedge operated rotatable drum brake assembly having a drum, a plurality of movable drum engaging members disposed in end-to-end spaced circumferential relation within the drum for movement toward and away from the drum, actuating members disposed between adjacent extremities of the drum engaging members and each having one extremity coupled for movement with an adjacent drum engaging member and having its other extremity tapered transverse to its axis, operating members reciprocably movable perpendicular to the axes of said actuating members and each having an axially tapered free extremity operably disposed for wedging coaction with said tapered other extremities of said actuating members to convert movement of the operating member perpendicular to the axes of the actuating members into drum engaging movement of the drum engaging members, a motor including a housing fixed relative to the wheel axis and including an annular power actuated member encircling the drum axis and supported for axial reciprocation adjacent the operating members, and means coupling the operating members to the power actuated member for reciprocation therewith.

2. A drum brake assembly in accordance with claim 1 in which the motor is a fluid motor.

3. A drum brake assembly in accordance with claim 2 in which the motor is a compressed gas motor.

4. In a wedge operated rotatable drum brake assembly having a drum, a plurality of movable drum engaging members disposed in end-to-end spaced circumferential relation within the drum for movement toward and away from the drum, actuating members disposed between adjacent extremities of drum engaging members and each having one extremity coupled for movement with an adjacent drum engaging member and having its other extremity tapered transverse to its axis, operating members reciprocably movable parallel to the drum axis and each having an axially tapered free extremity operably disposed for wedging coaction with said tapered other extremities of said actuating members to convert movement of the operating member parallel to the axis of the drum into drum engaging movement of the drum engaging members, a fluid actuated motor including a housing fixed relative to the wheel axis and including an annular fluid chamber and an annular piston encircling the drum axis and supported for axial reciprocation adjacent the operating member, and rolling diaphragm means disposed between said chamber and said piston and dividing said chamber into a high pressure portion and a low pressure portion, and means coupling the operating members to the annular piston for reciprocation therewith.

5. In a wedge operated rotatable drum brake assembly having a wheel axle carrying a flange forming a support, a wheel mounted for rotation on said axle and having a brake drum secured thereto for rotation therewith, a brake assembly therefor comprising a plurality of movable drum engaging members disposed in end-to-end spaced circumferential relation within the drum for movement toward and away from the drum, actuating members disposed between adjacent extremities of the drum engaging members and each having one extremity coupled for movement with an adjacent drum engaging member and having its other extremity tapered transverse to its axis, operating members reciprocably movable perpendicular to the axes of said actuating members and each having an axially tapered free extremity operably disposed for wedging coaction with said tapered other extremities of said actuating members to convert movement of the operating members perpendicular to the axes of the actuating members into drum engaging movement of the drum engaging members, a motor including a housing fixed relative to the wheel axis and including an annular power actuating member encircling the drum axis in concentric relation to the drum axis and supported for axial reciprocation adjacent the operating members, and means coupling the operating members to the power actuated member for reciprocation therewith.

6. In a rotatable drum brake assembly having a wheel axle carrying a flange forming a support, a wheel mounted for rotation on said axle and having a brake drum secured thereto for rotation therewith, a brake assembly therefore comprising a plurality of drum engaging members disposed in end-to-end spaced circumferential relation within the drum and operably mounted on said support for movement toward and away from engagement with the drum, operating members movably carried by the support for reciprocation parallel to the drum axis, actuator means coacting between each said operating member and adjacent extremities of said drum engaging members to convert a movement of the operating member parallel to the axis of the drum into movement of the drum engaging member into engagement with the drum, a motor including a housing fixed relative to the wheel axis and including a movable annular power actuating member encircling the drum axis in concentric relation to the drum axis and supporting for axial reciprocation adjacent the operating member, and means coupling the operating member to the power actuating member for reciprocation therewith.

7. A drum brake assembly in accordance with claim 6 in which the motor is a fluid motor.

8. A drum brake assembly in accordance with claim 7 in which the motor is a compressed gas motor.

9. In a rotatable drum brake assembly having a wheel axle carrying an axle flange forming a support, a wheel mounted for rotation on said axle and having a brake drum secured therewith for rotation therewith, a brake assembly therefor comprising at least a pair of drum engaging members disposed in end-to-end spaced circumferential relation within the drum and operably mounted on said support for movement toward and away from engagement with the drum, a pair of operating members movably carried by the support for reciprocation parallel to the drum axis, actuating means coacting between the extremities of adjacent drum engaging members and each said operating member to convert movement of the operator member parallel to the axis of the drum into movement of the drum engaging members into and out of engagement with the drum, a motor including a housing fixed relative to the wheel axis and including a movable power actuated annulus concentrically encircling the drum axis and supported for axial reciprocation adjacent the operating member, and means coupling the operating members to the power actuated member for reciprocation therewith.

10. In a rotatable wheel drum brake assembly a wheel axle carrying an axle flange forming a support, a wheel mounted for rotation on said axle and having a brake drum secured thereto for rotation therewith, a brake assembly therefor comprising a spider adapted to be secured to and supported by said axle flange, a pair of arcuate drum engaging members in double ended free floating arrangement operably mounted on said spider in end-to-end spaced circumferential relation with the drum for movement toward and away from engagement with the drum, a pair of oppositely disposed operating members movably carried by the spider for reciprocation parallel to the drum axis diametrically oppositely disposed between the confronting extremities of said drum engaging members, actuator housing means integral with said spider on opposite edges thereof, actuating means in said housing means coacting between each pair of confronting extremities of said arcuate drum engaging members to convert movement of each of said operating members, respectively, parallel to the axis of the drum into movement of the drum engaging members into and out of engagement with the drum, a motor including a housing fixed relative to the wheel axis and including a movable power actuated annulus concentrically encircling the drum axis and adapted to pass freely over the axle flange in unit with the complete assembly and supported for axial reciprocation adjacent the operating members, and means coupling the operating members at diametrically opposed points on said power actuated member for reciprocation therewith.

11. An assembly in accordance with claim 10 in which the motor includes an annular chamber fixed relative to the wheel axis, an annular piston mounted for axial movement in said chamber, and fluid means for axially moving said piston.

12. An assembly in accordance with claim 10 in which the motor includes an annular chamber fixed relative to the wheel axis and having cylindrical side walls, an annular piston mounted for axial movement in said chamber, rolling diaphragm means disposed between said chamber and said piston and dividing said annular chamber into a high pressure portion and a low pressure portion and fluid means coacting with said high pressure portion for actuating said diaphragm to effect axial movement of said piston.

13. An assembly in accordance with claim 12 in which the diaphragm is formed of a fiber reinforced elastomeric material.

14. An essambly in accordance with claim 10 in which the motor includes an annular chamber fixed relative to the wheel axis having cylindrical side walls, an annular piston mounted for axial movement in said chamber, sealing ring means disposed between said chamber and said piston and dividing said annular chamber into a high pressure portion and a low pressure portion and fluid means coacting with said high pressure portion for effecting axial movement of said piston.

References Cited by the Examiner

UNITED STATES PATENTS

| 1,968,667 | 7/34  | White  | 188—152   |
| 2,094,065 | 9/37  | Frank  | 188—152 X |
| 2,247,374 | 7/41  | Hawley | 188—152   |
| 2,487,117 | 11/49 | Eaton  | 188—152   |
| 2,757,640 | 8/56  | White  | 188—152 X |
| 2,820,434 | 1/58  | Otto   | 92—101 X  |
| 2,961,183 | 11/60 | Herr   | 188—152 X |
| 2,989,149 | 6/61  | Klaue  | 188—152 X |
| 2,989,991 | 6/61  | Knobel | 92—92 X   |

ARTHUR L. LA POINT, *Primary Examiner.*

EUGENE G. BOTZ, *Examiner.*